UNITED STATES PATENT OFFICE.

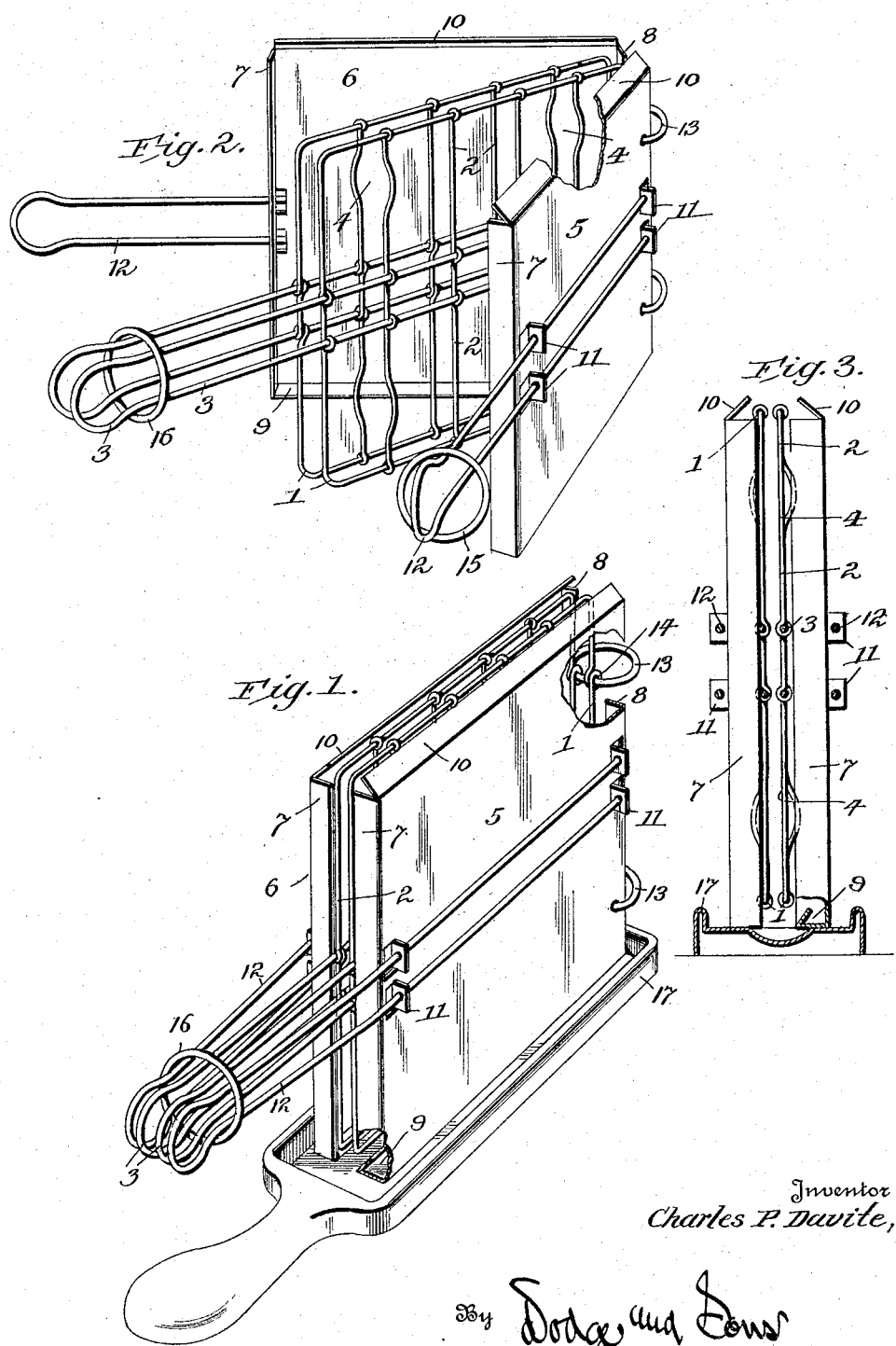

CHARLES P. DAVITE, OF NEW YORK, N. Y., ASSIGNOR OF ONE-HALF TO WILLIAM WELLES BOSWORTH, OF NEW YORK, N. Y.

DOMESTIC BROILER.

1,201,704.            Specification of Letters Patent.            Patented Oct. 17, 1916.

Application filed May 20, 1916. Serial No. 98,878.

*To all whom it may concern:*

Be it known that I, CHARLES P. DAVITE, a citizen of the United States, residing at 340 East One Hundred and Fifty-first street, New York, in the county of Bronx and State of New York, have invented a certain new and useful Improvement in Domestic Broilers, of which the following is a specification.

My present invention pertains to domestic broilers, the construction and advantages of which will be hereinafter set forth, reference being had to the annexed drawings, wherein:

Figure 1 is a perspective view of the broiler in its closed condition and shown as resting on edge in a draining pan; Fig. 2 a similar view, the cover plates being shown as opened; and Fig. 3 an end elevation, with the handles of the covers and grill members omitted.

The object of the present invention is to produce a simple and effective domestic broiler, by the use of which odors, incident to cooking, will be reduced to a minimum, and the draining of the grease from the substance being cooked may be readily effected in a cleanly manner.

The grill members, of which there are two, are each formed from wire and may be said to comprise a substantially rectangular frame 1 and a plurality of cross bars 2 secured to the opposite side elements of the frame. Bail-shaped handles 3, slightly enlarged or bulged outwardly at their outer ends, are each connected to the adjacent frame member, and to the cross bars 2, as clearly indicated in Fig. 2, the connections between the various parts or elements being preferably effected by twisting the wires about each other, as is usual.

One or more of the cross bars of each frame (preferably the inner and outermost ones) will be bowed outwardly, as at 4, thereby producing limiting stops for the covers or cover plates 5 and 6, and preventing said plates from coming into contact with the major portion of the grill body and the meat held between the grill elements. Said cover plates are alike in form and are slightly larger in area than the grills which they normally inclose. Each plate is provided at its forward end with an inturned wall or flange 7, a similar flange 8 being provided at the rear. At one side, or that which may be termed the bottom of the broiler when it is stood on edge in draining position, the edge of the plate is carried inwardly at substantially right angles and then turned upwardly and outwardly toward the cover plate, forming a trough 9. At the opposite side the cover or plate is turned inwardly, as at 10, but as will be seen this flange or inturned portion is turned in only to the extent of about 45°, or thereabouts, so as to leave a relatively larger opening between the contiguous elements 10 than that which obtains between the troughs or between the flanges 7 when the covers are in their closed position, whereby, when the broiler is in draining position, air will have free passage through such relatively larger opening.

Ears 11 will be struck out from each plate and a handle 12, of the same form as the handles 3, will be secured therein.

Rings 13, passing through openings in the plates 5 and 6, and through eyes 14 formed in the wires of the frames 1, serve to hold the grills and plates together and to allow them to be readily swung apart when necessary.

A sliding ring 15 will be employed to lock the handles together, and a separate ring, 16, may, if desired, be employed in conjunction with the handles 3 alone.

An elongated drain pan, 17, is shown in Figs. 1 and 3, into which the grease from the troughs 9 may run, but the use of such pan is not essential, as the grease may be run off onto paper or into any suitable receptacle.

In use the meat to be broiled is placed between the grill members, after which the covers are closed and the parts locked by ring 15, or rings 15 and 16, as the case may be. The broiler is then laid or held in a flat position over the fire and turned from time to time. In case the meat should be fat, the broiler will be lifted periodically and turned to a vertical position, whereupon the grease on the inside of the covers will run down into the troughs, from which it will drain into pan 17, or other receptacle.

The cover plates prevent the meat from burning, and likewise prevent, to a very great extent, any grease from getting into the fire.

The meat, may, if desired, be slightly singed after cooking is completed, to produce that taste or flavor which usually obtains with broiled meat.

Having thus described my invention, what I claim is:

1. In a domestic broiler, the combination of a pair of grills; a pair of cover plates, said grills and plates being hingedly connected at one end; handles extending outwardly from said grills and plates; and a trough formed upon one edge of each plate, the troughs being oppositely arranged.

2. In a domestic broiler, the combination of a pair of grills; a pair of cover plates, said grills and plates being hingedly connected at one end; handles extending outwardly from said members; a trough formed on one edge of each plate, said troughs being oppositely arranged; and flanges extending inwardly from the other edges of the plates.

3. In a domestic broiler, the combination of a pair of grills; a pair of cover plates, said grills and plates being hingedly connected at one end; handles extending outwardly from said members; a trough formed on one edge of each plate, said troughs being oppositely arranged; and flanges extending inwardly from the other edges of the plates, those flanges which are located opposite the troughs flaring outwardly and thereby forming a relatively large opening for the passage of air.

4. In a domestic broiler, the combination of a pair of grills, each formed of a wire frame and cross bars, one or more of said bars being formed with outwardly-bowed portions; a pair of cover plates, said plates and grills being hingedly connected at one end; and means for securing the plates in closed position, said bowed portions acting as stops to hold the plates out of contact with the grills.

5. In a domestic broiler, the combination of a pair of grills each formed of a wire frame and cross bars, a plurality of the bars of each frame being bowed outwardly; a pair of cover plates; a trough formed on one edge of each plate, said troughs being oppositely disposed; flanges extending inwardly from the outer edges of the plates, those flanges which are located diametrically opposite the troughs flaring outwardly and forming a relatively large opening for the passage of air; a pair of rings pivotally connecting said plates and the grills; a handle extending outwardly from each plate and grill; and means coacting with the handles to secure the parts in their closed position.

In testimony whereof I have signed my name to this specification.

CHARLES P. DAVITE.

Copies of this patent may be obtained for five cents each, by addressing the "Commissioner of Patents, Washington, D. C."